April 14, 1953 J. ROGOFF 2,635,132
OIL-FILLED CABLE CONNECTOR SEAL
Filed June 7, 1949
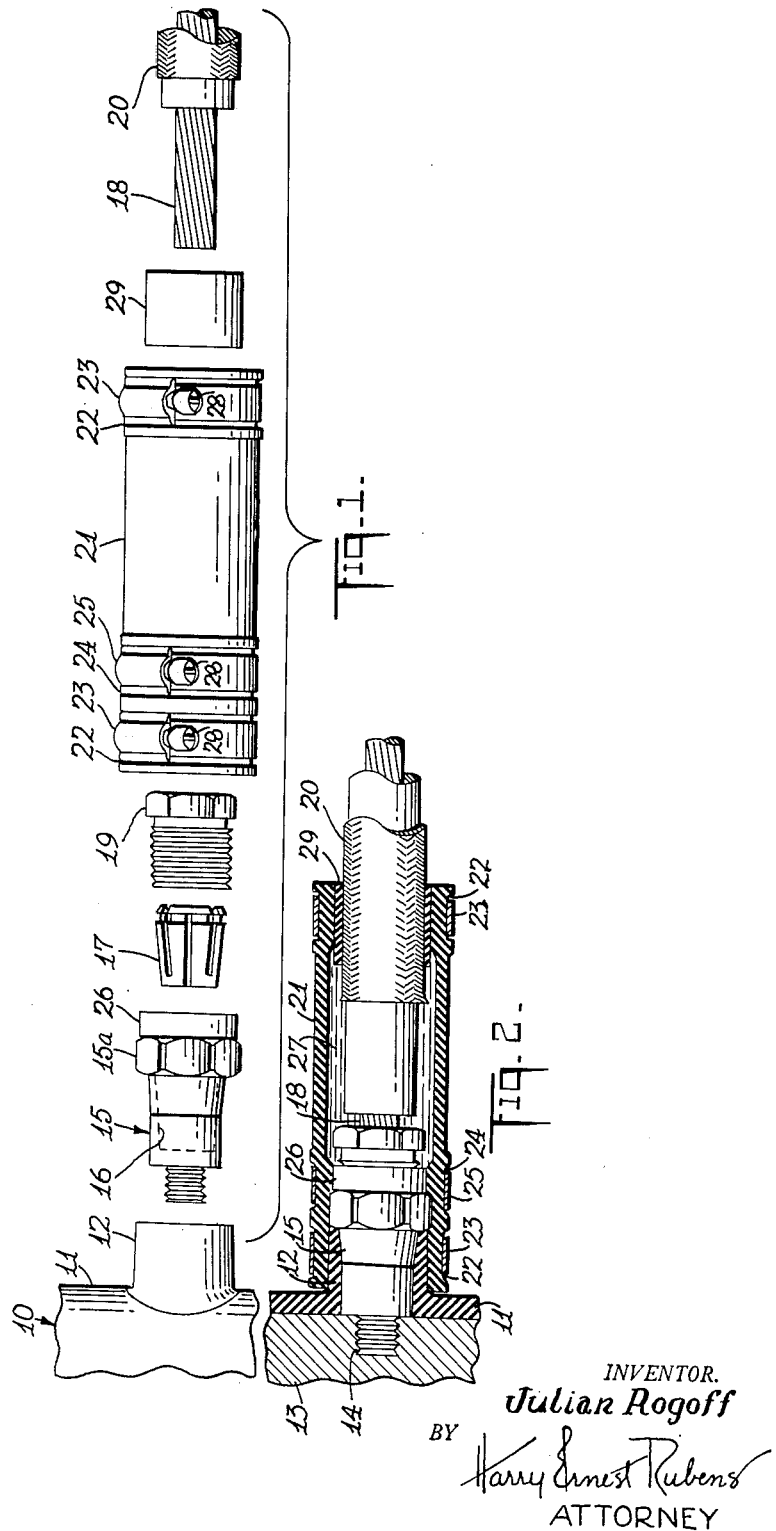
INVENTOR.
Julian Rogoff
BY
Harry Ernest Rubens
ATTORNEY Patented Apr. 14, 1953

2,635,132

UNITED STATES PATENT OFFICE 2,635,132

OIL-FILLED CABLE CONNECTOR SEAL

Julian Rogoff, New Rochelle, N. Y., assignor to Burndy Engineering Company, Inc., a corporation of New York Application June 7, 1949, Serial No. 97,570

1 Claim. (Cl. 174—20)

My invention relates to seals for oil filled cable connections and more particularly to a seal for preventing the oil from a cable from leaking into and through a multiple connector.

In connecting oil filled cables to terminals, especially of the multiple connection type, it has been hitherto necessary to apply a complicated taping operation to provide a water and oil-tight seal.

The principal object of my invention is to provide a simple means which may be easily applied to a cable connection; which will insulate and seal the connection against the entrance of water; and which will prevent the oil from the cable from leaking into the terminal connector itself.

I accomplish these and other objects and obtain my new results as will be apparent from the device described in the following specification, particularly pointed out in the claim, and illustrated in the accompanying drawing, in which—

Fig. 1 is an exploded view of the cable attaching elements, and the elements of my device used for obtaining the seal.

Fig. 2 is a longitudinal sectional view of the assembled connection and seal.

Referring more in detail to the drawing, reference numeral 10 designates an insulated multiple connector, having an insulating cover 11 projecting transversely therefrom to form the neck 12. Within the cover the metal connector body 13 is provided with a threaded recess 14 for receiving the threaded socket 15. The end of the socket wall is hexagonally shaped with wrench-engaging surfaces 15a to facilitate insertion in the recess 14, and contains a tapered socket recess 16 for receiving a cone-shaped slotted sleeve 17, internally threaded for gripping the bared end of the cable 18. An adjusting nut 19 drives the sleeve into the socket compressing the sleeve about the cable end, the socket and nut having threads for advancing the nut thereon.

Hitherto the connection has been taped from the cable insulation 20 to the neck 12 of the connector. In place thereof, I propose to slip over the end of the cable a compressible insulating and sealing sleeve 21 which may be made of rubber having a seat 22 at each end for a compressing ring device 23. The seat may be a recess or formed by two beads to position the compressing rings accurately. A third and intermediate seat 24 is provided which will permit a third compressing ring 25 to be positioned directly over a cylindrical clamping surface 26 which is located on the outside wall of socket member 15. The socket recess 16 receiving the end of the cable is open only at the cable entrance. Thus compressing the insulating and sealing sleeve to the clamping surface 26 of the socket member will effectively seal the flow of oil from the cable, and lock it within the sleeve portion extending away from the connector 10, or the chamber 27.

The compressing ring device 23 may be any circumferentially compressing element, such as a metal C-ring, the ends of the ring being pulled towards each other by the bolt 28.

The connection is made by first stripping the end of the cable, passing an adaptor 29 over the outside sheath to establish a snug fit with the insulating sleeve. Thereafter the sleeve, adjusting nut, and cone-shaped sleeve are passed over the cable end in the order given. The cable end, with the sleeve is pushed into the socket 16 as far as it will go, and the adjusting nut threaded to the socket as far as it will go. The insulating sleeve is then slipped over the end of neck 12 until it fits flush against the connector wall 11. Tightening clamps 23 and 55 in their seats will automatically seal the connection at the proper points, as shown in Fig. 2.

The insulating and sealing of the joint is thus completed, eliminating the need for lengthy time-consuming taping operations hitherto employed. In addition an effective block against seepage of the oil in the connector through recess 14 is thus provided.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claim, and by means of which, objects of my invention are attained and new results accomplished, as it is obvious that the particular embodiments herein shown and described are only some of the many that can be employed to attain these objects and accomplish these results.

I claim:

A cable sealing device for an oil filled electrical connection to an insulated cable comprising an insulated connector body, a removable and closed cable socket member for receiving the bared end of the cable and having an externally positioned clamping seat, means for securing the cable to the socket, a compressible insulating sleeve enclosing the connection and extending over the cable socket member from the insulation of the connector to the insulation of the cable; insulation compressing means for compressing the two ends of the insulating sleeve to the insulation of the connector and the cable and against the externally positioned clamping seat of the member for forming a sealed oil confining chamber for preventing the passage of oil beyond the cable socket and for forming an auxiliary sealed chamber between the said socket member and the connector insulation and body for preventing seepage of oil between the connector body and insulation, said insulating sleeve provided with an external circumferential seat molded thereon above the clamping seat of the socket member for properly positioning the said insulation compressing means for forming the chambers.

JULIAN ROGOFF.

References Cited in the file of this patent

UNITED STATES PATENTS

| Number | Name | Date |
|---|---|---|
| 635,960 | Grush | Oct. 31, 1899 |
| 868,460 | L'Hoest et al. | Oct. 15, 1907 |
| 1,870,833 | Burr | Aug. 9, 1932 |
| 2,182,896 | Hixon | Dec. 12, 1939 |
| 2,239,900 | Popp | Apr. 29, 1941 |
| 2,241,687 | Warnke | May 13, 1941 |
| 2,308,673 | Burgett | Jan. 19, 1943 |
| 2,320,470 | Rees | June 1, 1943 |
| 2,422,982 | Quackenbush | June 24, 1947 |
| 2,530,381 | Donohue | Nov. 21, 1950 |